United States Patent
Cullen et al.

(10) Patent No.: US 9,327,238 B2
(45) Date of Patent: May 3, 2016

(54) METHOD FOR REMOVING CO, $H_2$ AND $CH_4$ FROM AN ANODE WASTE GAS OF A FUEL CELL AND CATALYST SYSTEM USEFUL FOR REMOVING THESE GASES

(75) Inventors: Greg Cullen, Amesbury, MA (US); Jon P. Wagner, Louisville, KY (US); Georg Anfang, Feldkirchen-Westerham (DE); Chandra Ratnasamy, Louisville, KY (US)

(73) Assignee: CLARIANT CORPORATION, Louisville, KY (US)

(*) Notice: Subject to any disclaimer, the term of this patent is extended or adjusted under 35 U.S.C. 154(b) by 1113 days.

(21) Appl. No.: 13/297,312

(22) Filed: Nov. 16, 2011

(65) Prior Publication Data
US 2012/0128563 A1 May 24, 2012

Related U.S. Application Data (60) Provisional application No. 61/415,171, filed on Nov. 18, 2010.

(51) Int. Cl.
| | |
|---|---|
| *B01D 53/72* | (2006.01) |
| *B01D 53/86* | (2006.01) |
| *B01J 23/889* | (2006.01) |
| *H01M 8/06* | (2016.01) |
| *B01J 23/42* | (2006.01) |
| *B01J 23/44* | (2006.01) |

(Continued)

(52) U.S. Cl.
CPC ............ *B01D 53/864* (2013.01); *B01J 23/8892* (2013.01); *H01M 8/0662* (2013.01); *H01M 8/0668* (2013.01); *B01J 23/42* (2013.01); *B01J 23/44* (2013.01); *B01J 35/026* (2013.01); *B01J 35/04* (2013.01); *B01J 37/0215* (2013.01); *Y02E 60/50* (2013.01)

(58) Field of Classification Search
CPC ...... B01D 53/864; B01D 53/72; B01D 53/86; B01J 23/8892; B01J 23/42; B01J 23/44; B01J 35/00; B01J 35/04; B01J 35/026; B01J 37/0215; Y02E 60/50; H01M 8/0662; H01M 8/0668
See application file for complete search history.

(56) References Cited

U.S. PATENT DOCUMENTS

| | | |
|---|---|---|
| 4,788,174 A | 11/1988 | Arai |
| 4,793,904 A * | 12/1988 | Mazanec et al. .............. 205/334 |

(Continued)

FOREIGN PATENT DOCUMENTS

| | | |
|---|---|---|
| GB | 953216 | 3/1964 |
| GB | 2065629 | 7/1981 |

(Continued)

OTHER PUBLICATIONS

International Search Report and The Written Opinion of the International Searching Authority, May 7, 2012.

*Primary Examiner* — Melvin C Mayes
*Assistant Examiner* — Smita Patel (57) ABSTRACT

A system for removing CO, $H_2$ and $CH_4$ from an anode waste gas stream from a fuel cell is disclosed. The two catalyst system may comprise a platinum/palladium catalyst and a copper/manganese catalyst. The anode waste stream comes in contact with the platinum/palladium catalyst prior to contacting the copper/manganese catalyst.

20 Claims, 5 Drawing Sheets

(51) Int. Cl.
*B01J 35/02* (2006.01)
*B01J 35/04* (2006.01)
*B01J 37/02* (2006.01)

(56) References Cited

U.S. PATENT DOCUMENTS

| | | |
|---|---|---|
| 5,271,916 A | 12/1993 | Vanderborgh et al. |
| 6,683,021 B2 | 1/2004 | Cremona et al. |
| 7,329,627 B2 | 2/2008 | Wanninger et al. |
| 7,749,938 B2 | 7/2010 | Obayashi et al. |
| 2002/0147103 A1 | 10/2002 | Ruettinger et al. |
| 2010/0074819 A1 | 3/2010 | Cremona et al. |
| 2011/0207003 A1* | 8/2011 | Anfang et al. ................ 429/412 |

FOREIGN PATENT DOCUMENTS

| | | |
|---|---|---|
| WO | WO2004103556 | 12/2004 |
| WO | WO 2009021850 A1 * | 2/2009 |

* cited by examiner

METHOD FOR REMOVING CO, H₂ AND CH₄ FROM AN ANODE WASTE GAS OF A FUEL CELL AND CATALYST SYSTEM USEFUL FOR REMOVING THESE GASES

REFERENCE TO RELATED APPLICATIONS

This application claims priority to U.S. Provisional Patent Application 61/415,171, filed Nov. 18, 2010. The content of this Application is incorporated herein by reference in its entirety.

FIELD OF THE INVENTION

The present invention relates to apparatus, methods and applications for removing CO, $H_2$ and $CH_4$ from an anode waste gas of a fuel cell and catalyst system useful for removing these gases.

BACKGROUND

Fuel cells offer the opportunity of obtaining electric power with high efficiency from electro chemical conversion of hydrogen. However, as hydrogen is difficult to store or transport because of the high explosion hazard associated with it, methanol or hydrocarbons are, at present, used as the hydrogen source and hydrogen is then produced from these compounds in an upstream reformer. Methanol is liquid under normal conditions and can therefore be transported and stored without any great problems. Hydrocarbons are either likewise liquid under normal conditions or can easily be liquefied under super atmospheric pressure. In the case of natural gas, which consists essentially of methane, an appropriate infrastructure already exists, so that stationary energy-producing apparatus based on fuel cells can readily be operated using methane as the starting material.

Hydrogen can be liberated from methane by steam reforming. The resulting gas consists essentially of hydrogen, carbon dioxide and carbon monoxide together with traces of unreacted methane and water. This gas can be used as fuel gas for a fuel cell. To shift the equilibrium in steam reforming to the side of hydrogen, reforming has to be carried out at temperatures of about 650 degrees C. To achieve a constant composition of the fuel gas, this temperature should be adhered to as exactly as possible.

Fuel cell arrangements in which the fuel gas produced from methane and water can be utilized for generation of energy are known in the art. Such arrangements may comprise a number of fuel cells which are arranged in a fuel cell stack within a closed protective housing. Fuel gas, consisting essentially of hydrogen, carbon dioxide, carbon monoxide and residual methane and water, is fed to the fuel cells via an anode gas inlet. The fuel gas is produced from methane and water in the upstream reformer. On the anode side, the fuel gas is consumed to produce electrons according to the following reaction equations:

$$CO_3^{2-}+H_2 \to H_2O+CO_2+2e^-$$

$$CO_3^{2-}+CO \to 2CO_2+2e^-$$

To achieve high efficiency of the fuel cell, the reaction is carried out so that it does not proceed to completion. The anode waste gas therefore comprises not only the reaction products, carbon dioxide and water, but also unconverted hydrogen, carbon monoxide and methane. To remove the residual hydrogen, carbon monoxide and methane the anode waste gas is mixed with air and then fed to a catalytic waste gas burner in which the remaining methane, carbon monoxide and traces of hydrogen are oxidized to form water and carbon dioxide.

To remove residues of hydrogen, therefore, the anode waste gas is first mixed with air and then fed to a catalytic waste gas burner in which the remaining methane, carbon monoxide and also traces of hydrogen are oxidized to water and carbon dioxide. Optionally, or alternatively, in addition to the anode waste gas and air, other gases such as cathode waste gas can be admixed. The thermal energy released in the process can be used in different ways.

In the prior art noble metals, for example platinum and/or palladium, which are provided in finely-distributed form on a suitable support, are currently used as catalysts for waste gas burners. This catalytic combustion has the advantage that it is very steady and has no temperature peaks. The oxidation reaction on palladium catalysts proceeds at temperatures in the range from approximately 450 to 550° C. At higher temperatures of over approximately 800 to 900° C., the Pd/PdO balance shifts in favor of palladium metal, whereby the activity of the catalyst decreases. A loss of activity is observed as a result of sintering occurring or the coking of the catalyst particles. In addition, noble metal catalysts have the disadvantage of very high raw material prices.

Alternatively, heat-stable catalysts for the catalytic combustion of methane are known. These are based on alkaline earth hexaaluminates which contain Mn, Co, Fe, Ni, Cu or Cr. These catalysts are characterized by high activity and resistance, even at temperatures of more than 1200° C. However, the activity of these catalysts is relatively low at temperatures in the preferred range of 500-800° C. To be able to provide adequate catalytic activity also at lower temperatures, small quantities of platinum metals are added, for example Pt, Ru, Rh or Pd.

Notwithstanding, there is still a need for a cost favorable, active catalyst for long term stability for fuel cell arrangement which comprises a catalytic waste gas oxidizer for the oxidation of a mixture of anode waste gases, including CO, $H_2$ and $CH_4$, air and optionally other gases, such as cathode waste gases, which is stable and active for the removal of methane, CO and $H_2$.

BRIEF SUMMARY OF EMBODIMENTS OF THE INVENTION

One embodiment of the invention relates to a fuel cell that includes a catalytic waste gas burner for combustion of a mixture of anode waste gases, air and/or other admixed gases, which may also include cathode waste gases. The system utilizes two separate catalysts for this combustion. Also disclosed is a method and use for the catalysts for removal of CO, $H_2$ and $CH_4$ from the anode waste gas.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE INVENTION

It will be appreciated that the apparatus, methods, and applications of the invention can include any of the features described herein, either alone or in combination.

Embodiments under the present invention generally relate to a two catalyst system to reduce $CO/H_2/CH_4$ from an exhaust gas stream, particularly a fuel cell anode off gas stream. Used in this system is first a platinum/palladium catalyst. The ratio of the platinum to the palladium in the catalyst is from about 1:1 to 1:4. The loading of the platinum and palladium onto a support can vary up to about 5 grams/liter. In one alternative embodiment, the quantity is up to about 3.2 grams/liter. The minimum loading of the platinum and palladium is about 0.1 gm/liter. The platinum/palladium catalyst may be in the form of a monolith, foam, trihole catalyst, extrusion, sphere or any other shape with the platinum and palladium deposited upon the support using conventional processes. In one optional embodiment the platinum/palladium catalyst is prepared by impregnating a honeycomb with a mixed oxide support using conventional washcoating procedure. The washcoat contains at least 90% alumina. The washcoated honeycomb is then impregnated with the platinum and palladium using conventional salts, dried and calcined at 540° C.

In an alternative embodiment instead of using platinum and palladium, it is possible to use catalysts which contain platinum only or palladium only. While the use of platinum and palladium together is important to reduce metal sintering, support sintering, transformation of PdO→Pd+1/2 $O_2$ and coking, in some systems it may be useful to use only platinum or only palladium-based catalysts. Such catalyst system performs well under certain circumstances. If only platinum or only palladium is used, the quantities will be up to about 5 gm/liter on the support with a minimum of about 0.1 gm/liter on the support.

The second catalyst in the system comprises precious metal free, mixed oxides of copper and manganese, and in addition, optionally a rare earth metal, in which the metals can assume multivalent states. In general, the following compositions are possible, wherein the percentages are weight percentages relative to the total mass of Mn, Cu, and, in addition optionally contain rare earth metals: Mn 80-20%, Cu 20-60%, and rare earth metals 0-20%, preferably Mn 75-30%, Cu 20-55%, and rare earth metals 5-15%. In one embodiment the weight percentage compositions, expressed as oxides, are as follows: 50 to 60% MnO, 35 to 40% CuO and from about 2 to about 15% as a rare earth oxide in the lowest valence state. One alternative embodiment comprises 50 to 60% MnO, 35 to 40% CuO, and 10 to 12% $La_2O_3$.

The individual metals can also assume oxidation states other than those referenced above. As an example, the manganese can be present in the form of $MnO2$. The mass ratio of copper to manganese (calculated as Cu mass to Mn mass) on the finished catalyst can be 0.4 to 0.9, preferably 0.5 to 0.75.

By rare earth metals are meant lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu). La and Ce are preferred.

The Mn and Cu oxides are supported on porous inorganic supports, such as aluminum oxide, silicon dioxide, silicon dioxide-aluminum oxide, titanium dioxide or magnesium oxide. The oxides are supported in a quantity of generally 3 to 50 wt.-%, preferably 3 to 30 wt.-%, relative to the total mass of the catalyst and of the oxides. A rare earth metal can alternatively also already be present in the support. One role of the rare earth metal is to stabilize the BET surface area of the porous inorganic support. One embodiment is lanthanum-stabilized aluminum oxide. The determination of the BET surface area may be carried out in accordance with ASTM D3663, Standard Test Method for Surface Area of Catalysts and Catalyst Carriers. One embodiment is lanthanum-stabilized aluminum oxide.

The Mn/Cu catalyst can be prepared by first impregnating the support with a solution of a salt of lanthanum or cerium or another rare earth metal, if desired, drying it and then calcining it at a temperature of approximately 600° C. If the support already contains a rare earth metal for preparation-related reasons, if one is desired, this step is unnecessary. An example is aluminum oxides stabilized with lanthanum. The support is then impregnated with a solution of a copper and manganese salt, dried at 120 to 200° C. and calcined at up to 540° C.

Any soluble salt of the metals can be used. Examples of salts are nitrates, formates and acetates. Lanthanum is preferably used as lanthanum nitrate $La(NO_3)^3$; copper and manganese are preferably used as nitrates, namely $Cu(NO_3)^2$ and $Mn(NO_3)^3$.

A preferred impregnation process is dry impregnation, wherein a quantity of solution is used which is equal to or less than the pore volume of the support.

A particularly suitable embodiment is a catalyst, which is supported on γ-aluminum oxide, and in which the mixed oxides have the following composition, expressed as wt.-% of the oxides, as follows: $La_2O^3$=9.3, MnO=53.2, and CuO=37.5.

Furthermore, hopcalite catalysts can be used. These are mixed catalysts which mainly consist of manganese dioxide and copper(II) oxide. In addition, they may contain other metal oxides, for example cobalt oxides and silver(I) oxide.

Once the platinum/palladium catalyst and the copper/manganese catalyst have been prepared, the platinum/palladium catalyst is placed in the reactor so that it is first contacted by the anode waste gas. Then the copper/manganese catalyst is placed to follow the platinum/palladium catalyst either in a separate bed or in a separate section of the reactor so that the waste gas first contacts the platinum/palladium catalyst and then contacts the copper/manganese catalyst.

Figure 4:
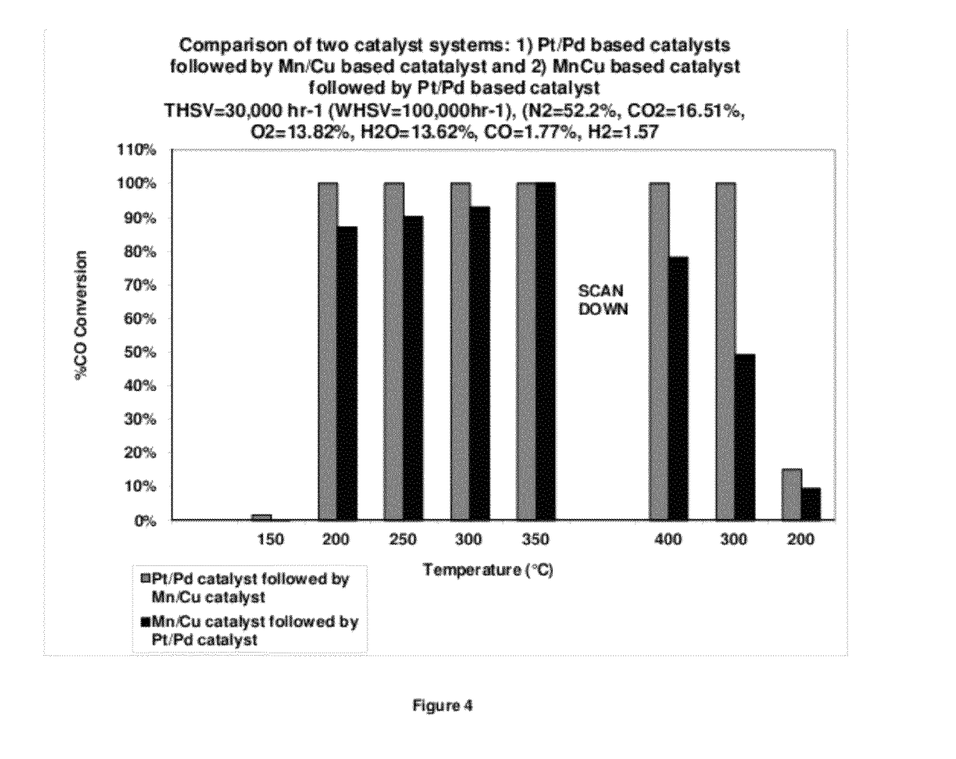
FIG. 4 compares two catalyst systems operating at temperatures from 150 to 800° C. and back to 200° C. for the conversion of CO (temperatures between 350 and 800° C. and back to 400° C. are not shown as conversion of CO is 100%), wherein the catalyst systems are: a) a platinum/palladium catalyst followed by a copper/manganese catalyst and b) a copper manganese catalyst followed by a platinum/palladium catalyst.

It has been discovered that the platinum/palladium catalyst effectively operates at temperatures from about 140 to about 800° C. and is primarily utilized to oxidize the CO and $H_2$. It has been surprisingly discovered, as shown by comparing the reaction of FIG. 1 and FIG. 2 that by use of the combination of the platinum/palladium catalyst and the manganese/copper catalyst, complete conversion of the hydrogen and CO can be achieved at a lower temperature than when using only the copper/manganese catalyst. In addition, as shown in FIG. 4, a catalyst system using the platinum/palladium catalyst placed prior to the copper/manganese catalyst in the catalyst system is more effective for removal of CO at a lower temperature than if the order of the catalysts is reversed. See FIG. 4.

In addition, because the platinum/palladium catalyst is highly reactive with $H_2$/CO at low temperatures, the resulting combustion heat generated increases the temperature to the Cu/Mn catalyst where high methane conversion can be achieved.

In addition, it is well known that precious metal-based catalysts, such as Pt/Pd catalysts, oxidize and convert completely $H_2$ and CO at low temperatures relatively easily. Further, it is also known that copper/manganese catalysts show a reduced activity at low temperatures, lower than that for the Pt/Pd catalyst, for $CH_4$ oxidation. However, it has been surprisingly discovered that once the respective catalysts age, the Cu/Mn catalyst have better stability and retain higher activity, which is significantly greater than that of the Pt/Pd catalyst. Accordingly, while the prior art might suggest that precious metal catalysts, such as Pt/Pd catalysts, should be used for the catalytic removal of CO, $H_2$ and $CH_4$ from an anode exhaust gas when reviewing fresh catalysts, it has been surprisingly discovered that upon aging, the combination of a platinum/palladium catalyst used at low temperatures with a copper/manganese catalyst used at higher temperatures show enhanced performance over the prior art precious metal based catalyst used alone. By aging is meant use for at least about 48 hours.

It has also been surprisingly discovered that the use of a two catalyst system, wherein the first catalyst comprises platinum/palladium and the second catalyst comprises copper/manganese, and optionally a rare earth metal oxide, shows enhanced performance over use of a single catalyst comprising copper/manganese, and optionally a rare earth metal catalyst, even when the copper/manganese catalyst is promoted with a precious metal, such as platinum and/or palladium. Though not wanting to be bound by a particular theory, it is theorized that the platinum/palladium catalyst, when used in series before the copper/manganese catalyst that optionally contains a rare earth metal, optimizes the performance of the overall catalyst system by first converting the CO and $H_2$ using the platinum/palladium catalyst with the $CH_4$ being converted at higher temperatures using the copper/manganese catalyst, which optionally contains a rare earth metal. This enhancement and improvement is especially notable upon the aging of the catalyst system. An example of the aging of a system is where heating of the catalysts occurs at a temperature of 900° C. for 48 hours or hydrothermally at 860° C. for 48 hours.

It has also been surprisingly discovered that this two catalyst system works efficiently and effectively at high space velocities.

In addition, by use of the precious metal free base metal catalyst comprising copper/manganese and optionally containing a rare earth metal, the cost of the overall catalyst system is reduced by reducing the quantity of the precious metals that are required for the overall catalyst system over catalyst systems in the past which have utilized only precious metal catalysts.

Example 1

Figure 1:
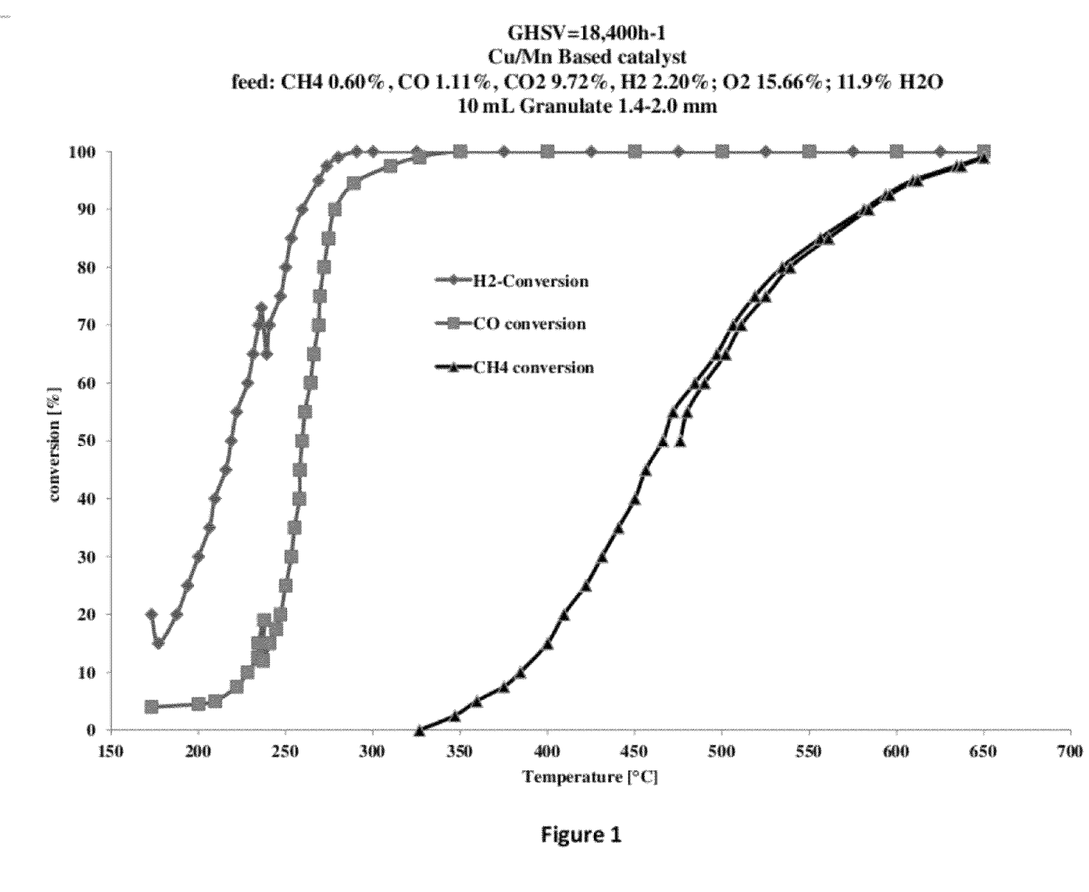
FIG. 1 depicts $CH_4$, CO, and $H_2$ conversion over a temperature range from about 150° C. to 700° C. of a copper/manganese catalyst.

A copper/manganese catalyst is produced in the form of 1.4 to 2.0 mm granulates. The catalyst contains 4.3% copper and 6.4% manganese on an alumina carrier with 2% La. The catalyst is in the form of a trihole formed by conventional procedures. 10 ml of the catalyst is placed in a reactor and a feed is passed therethrough comprising 0.6% $CH_4$, 1.11% CO, 9.7 $CO_2$, 2.2% $H_2$, 15.66% O2, 11.9% $H_2O$, with the remaining amount being $N_2$. The space velocity is 18,400 $H^{-1}$ GHSV. The reaction is run up to 700° C. The results are shown in FIG. 1.

Example 2

Figure 2:
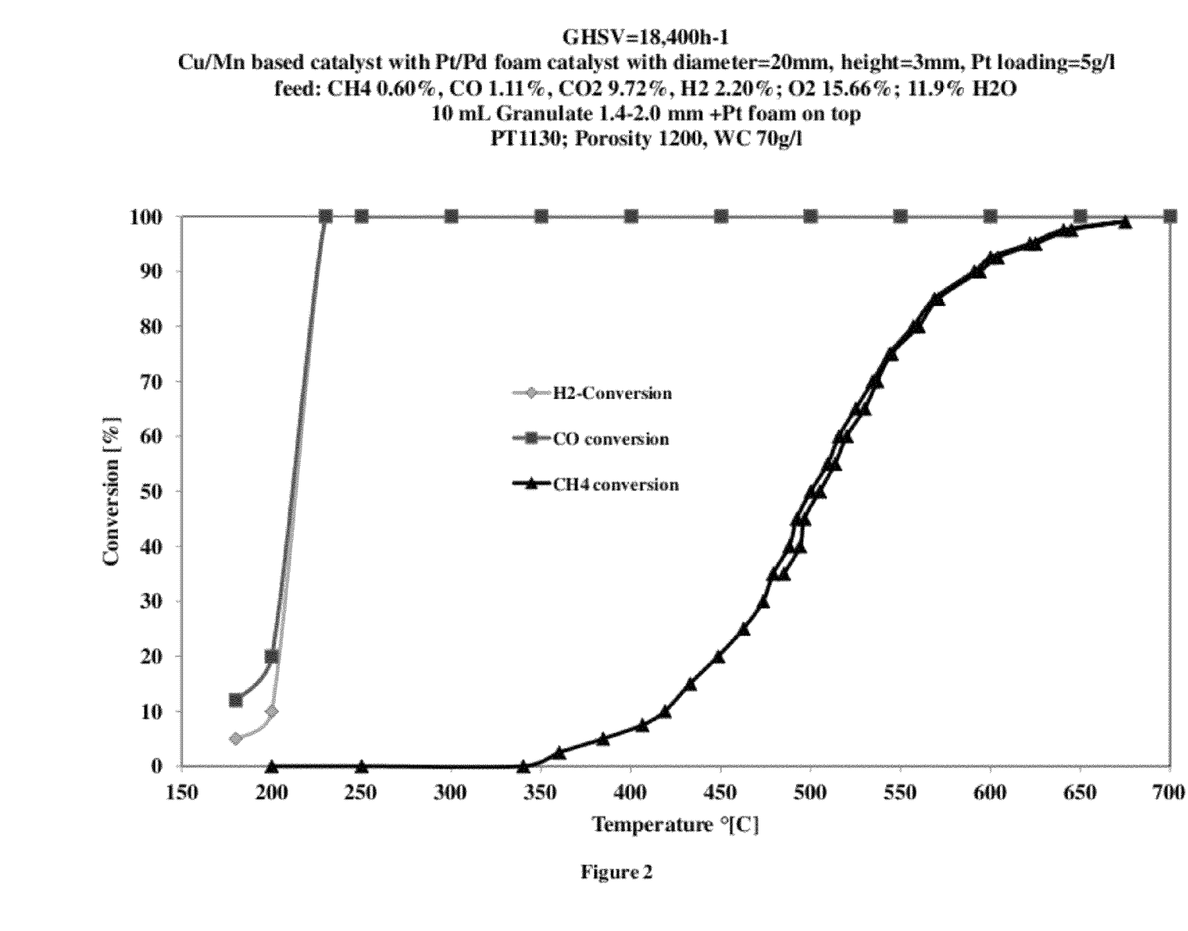
FIG. 2 depicts conversion of $CH_4$, CO and $H_2$ when using a combination of a platinum/palladium catalyst followed by a copper/manganese catalyst at a temperature from 150 to 700° C.

A copper/manganese catalyst is produced in the form of 1.4 to 2.0 mm granulates. The catalyst contains 4.3% copper and 6.4% manganese on an alumina carrier with 2% La. The catalyst is in the form of a trihole formed by a conventional process. A second catalyst containing 0.5% platinum and 1.0% palladium with a 1.5 gm/liter overall loading is produced. 10 ml of the Cu/Mn granulates are placed in a reactor and the Pt/Pd catalyst is placed on top. The feed is comprising 0.6% $CH_4$, 1.11% CO, 9.7 $CO_2$, 2.2% $H_2$, 15.66% $O_2$, 11.9% $H_2O$, with the remaining amount $N_2$ is passed first through the Pt/Pd catalyst and then through the Cu/Mn catalyst. The space velocity is 18,400 $H^{-1}$ GHSV. The reaction is run up to 700° C. over 3 days. The results are shown in FIG. 2.

Example 3

Figure 3:
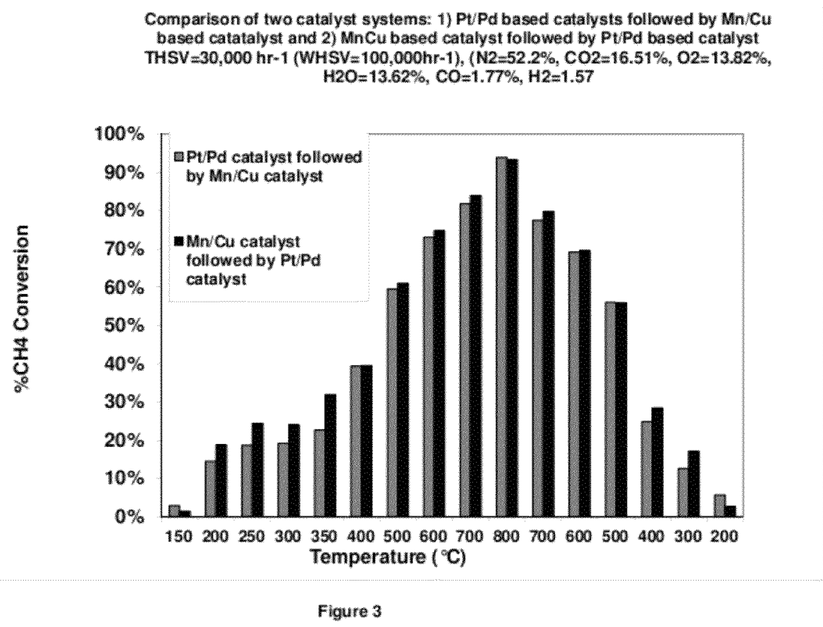
FIG. 3 compares two catalyst systems operating at temperatures from 150 to 800° C. and back to 200° C. for the conversion of $CH_4$, wherein the catalyst systems are: a) a platinum/palladium catalyst followed by a copper/manganese catalyst and b) a copper manganese catalyst followed by a platinum/palladium catalyst.

A feed gas is passed through two catalyst samples. In one test a platinum/palladium catalyst is used prior to a manganese/copper catalyst and in an alternative test their order in the feed stream is reversed. The results are shown in FIGS. 3 and 4. The feed is 52.2% $N_2$, 16.51% $CO_2$, 13.82% $O_2$, 13.62% $H_2O$, 1.77% CO, 1.57% $H_2$, and 0.5% $CH_4$. The space velocity is 30,000 $HR^{-1}$ THSV. The catalysts used include a platinum/palladium catalyst containing a 1:3 Pt/Pd ratio with a total loading of 1.4 g/l. The Cu/Mn catalyst contains 12% copper, 20% manganese on a mixed oxide carrier. The test is run on the feed by ramping up the temperature of the feed from 150 to 800° then ramping it back down to 200°. The test is run over 72 hours.

As is clear from FIG. 3 there is no significant differences in $CH_4$ conversion between the two catalyst systems. However in FIG. 4, the CO conversion improves when the Pt/Pd catalyst is placed in front of the copper/manganese catalyst.

It is clear from these examples that the use of a platinum/palladium catalyst in a catalyst bed prior to a copper/manganese catalyst results in a lower temperature of conversion of the hydrogen and CO in an anode waste gas, reducing the temperature for 100% conversion by about 100° C. In addition, there is also a more complete conversion of CO when using the catalyst system where the platinum/palladium catalyst is used prior to the copper/manganese catalyst. Further, these advantages are achieved at high space velocities.

Example 4

Figure 5:
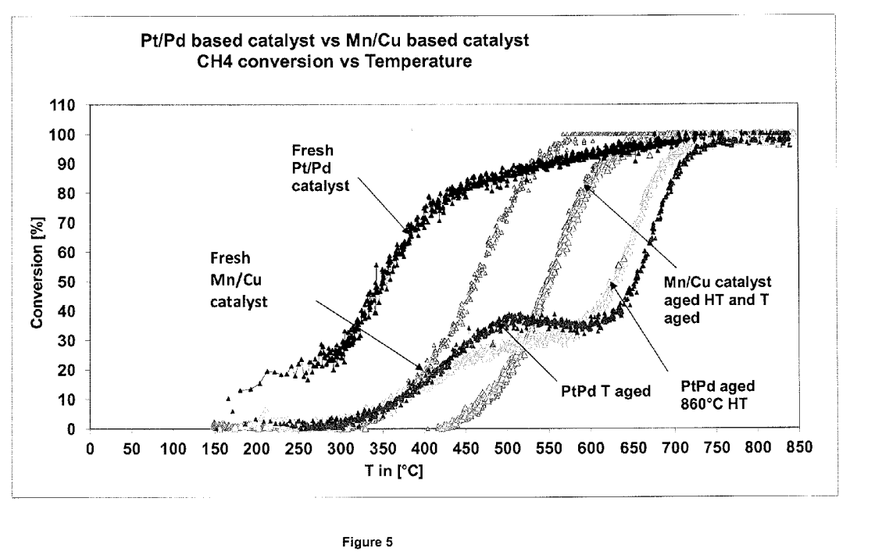
FIG. 5 compares the performance of a platinum/palladium catalyst and a base metal copper/manganese catalyst for the conversion of $CH_4$ in a temperature range from 0 to 850° C. and a comparison of the performance of these catalysts as fresh catalysts verses aged catalysts.

In order to test the impact of aging on the catalyst a comparison of $CH_4$ oxidation on fresh and aged catalyst is prepared. A platinum/palladium catalyst containing 1:4 Pt/Pd with a total loading of 1.4 g/l on an alumina support, which is impregnated on a honeycomb, is prepared. In addition, a base metal catalyst containing copper/manganese is prepared containing 12% copper, 20% manganese and 1.7% La impregnated on a honeycomb with a mixed oxide support using conventional washcoating procedures. Tests are run on each of these catalysts both as fresh catalysts and aged catalysts. For aging, the catalysts are treated either thermally by heating the catalyst to a temperature of 900° C. for 48 hours or hydrothermally at 860° C. for 48 hours. FIG. 5 shows that in the case of fresh samples, the precious metal catalysts have a lower light off than the base metal catalysts for $CH_4$ oxidation. On aging, however, the base metal catalyst retains more of its activity and has significantly higher activity then the precious metal catalyst.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method for removing CO, $H_2$ and $CH_4$ from an anode waste gas stream from a fuel cell configured to convert hydrogen and carbon monoxide to water and carbon dioxide, the method comprising passing the anode waste gas stream comprising CO, $H_2$ and $CH_4$ through a catalyst system, wherein the anode waste gas stream first contacts a platinum/palladium catalyst and then contacts a copper/manganese catalyst, wherein the contacting with the platinum/palladium catalyst and with the copper manganese catalyst completely converts the CO and $H_2$ of the anode waste gas stream, and converts at least 85 percent of the $CH_4$ of the anode waste gas stream.

2. The method of claim 1, wherein said copper/manganese catalyst further comprises at least one rare earth metal.

3. The method of claim 2, wherein said at least one rare earth metal is selected from the group consisting of lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu) and mixtures thereof.

4. The method of claim 3, wherein said at least one rare earth metal comprises Lanthanum (La).

5. The method of claim 3, wherein said at least one rare earth metal comprises Cerium (Ce).

6. The method of claim 1, wherein said copper/manganese catalyst comprises manganese and copper oxides supported on porous inorganic supports.

7. The method of claim 6, wherein said porous inorganic supports are selected from the group consisting of aluminum oxide, silicon dioxide, silicon dioxide-aluminum oxide, titanium dioxide and magnesium oxide.

8. The method according to claim 1, wherein the anode waste gas stream is contacted with the platinum/palladium catalyst at a lower temperature than the temperature at which the anode waste gas stream is contacted with the copper/manganese catalyst.

9. The method according to claim 1, wherein the contacting with the platinum/palladium catalyst and with the copper manganese catalyst completely converts 100 percent of the CO and $H_2$ of the anode waste gas stream.

10. A catalyst system for removing CO, $H_2$ and $CH_4$ from an anode waste gas stream from a fuel cell said catalyst system comprising a first platinum/palladium catalyst and a second copper/manganese catalyst, wherein said system is configured such that in use, said anode waste stream contacts said first catalyst before contacting said second catalyst.

11. The catalyst system of claim 10, wherein said copper/manganese catalyst comprises manganese and copper oxides supported on porous inorganic supports.

12. The catalyst system of claim 11, wherein said porous inorganic supports are selected from the group consisting of aluminum oxide, silicon dioxide, silicon dioxide-aluminum oxide, titanium dioxide and magnesium oxide.

13. The catalyst system of claim 11, wherein said copper/manganese catalyst further comprises at least one rare earth metal.

14. The catalyst system of claim 13, wherein said at least one rare earth metal is selected from the group consisting of lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu) and mixtures thereof.

15. The catalyst system of claim 14, wherein said at least one rare earth metal comprises Lanthanum (La).

16. The catalyst system of claim 14, wherein said at least one rare earth metal comprises Cerium (Ce).

17. The catalyst system of claim 10, wherein the mass ratio of copper to manganese on said second copper/manganese catalyst is in the range of 0.4 to 0.9.

18. The catalyst system of claim 10, wherein the mass ratio of copper to manganese on said second copper/manganese catalyst is in the range of 0.5 to 0.75.

19. A catalytic system comprising
a fuel cell configured to convert hydrogen and carbon monoxide to water and carbon dioxide and to provide an anode waste gas stream comprising CO, $H_2$ and $CH_4$; and
the catalyst system according to claim 10, wherein the fuel cell and the catalyst system are configured such that the anode waste gas stream first contacts the platinum/palladium catalyst, then contacts the copper/manganese catalyst.

20. The system according to claim 19, wherein the second copper/manganese catalyst includes 20-80% of manganese, 20-60% of copper, and 0-20% of one or more rare earth metals selected from the group consisting of lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu) and mixtures thereof, all on an oxide basis, and wherein the mass ratio of copper to manganese on said second copper/manganese catalyst is in the range of 0.4 to 0.9.

* * * * *